United States Patent
van der Lely

[11] 4,029,153
[45] June 14, 1977

[54] ROTARY HARROWS

[76] Inventor: Cornelis van der Lely, 7 Bruschenrain, Zug, Switzerland

[22] Filed: Mar. 6, 1975

[21] Appl. No.: 556,149

[30] Foreign Application Priority Data

Mar. 7, 1974 Netherlands .................... 7403070

[52] U.S. Cl. .................. 172/59; 172/776; 172/68; 172/78; 172/125

[51] Int. Cl.² ........................................ A01B 33/06

[58] Field of Search ............. 172/59, 68, 110, 776, 172/111, 125, 78

[56] References Cited

UNITED STATES PATENTS

| | | |
|---|---|---|
| 2,625,867 | 1/1953 | Hands .......................... 172/59 X |
| 2,777,272 | 1/1957 | Smith et al. .................. 172/59 |
| 3,530,944 | 9/1970 | Spell ............................ 172/59 |
| 3,616,862 | 11/1971 | van der Lely ............... 172/59 X |
| 3,821,989 | 7/1974 | van der Lely et al. ....... 172/59 |
| 3,885,633 | 5/1975 | van der Lely et al. ....... 172/68 |
| 3,899,029 | 8/1975 | van der Lely et al. ....... 172/59 X |
| 3,899,030 | 8/1975 | van der Lely et al. ....... 172/59 X |

Primary Examiner—George J. Marlo

Attorney, Agent, or Firm—Mason, Mason & Albright

[57] ABSTRACT

A rotary harrow has a plurality of soil working members mounted on corresponding shafts that extend upwardy within a hollow frame portion. Each shaft is journalled in bearings within the frame portion and has a pinion gear in mesh with neighboring gears of adjacent soil working members. Either of two different sized transmission gears on top of the frame portion can be connected to the p.t.o. of a prime mover to rotate the soil working members at different speeds. The frame portion has similar upper and lower U-shaped pans that have rims detachably fastened to one another. The ends of the frame portion are closed by sector plates and a rear roller has arms pivoted to the harrow and adjustably connected to the sector plates to regulate the working depths of the soil working members. The roller is comprised of elongate elements mounted on hollow supports that have concave recesses around their perimeters. The arms are connected to the roller by screened bearings and stub shafts that extend through a frusto conical shield located within a protective ring on the end supports.

7 Claims, 16 Drawing Figures

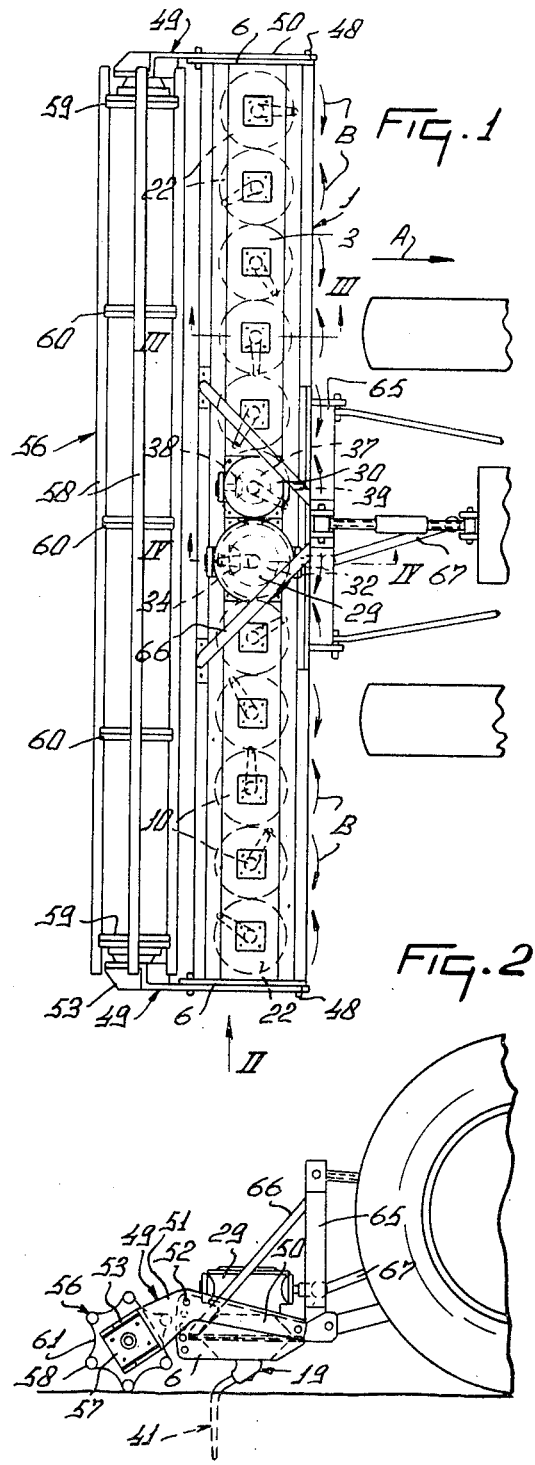

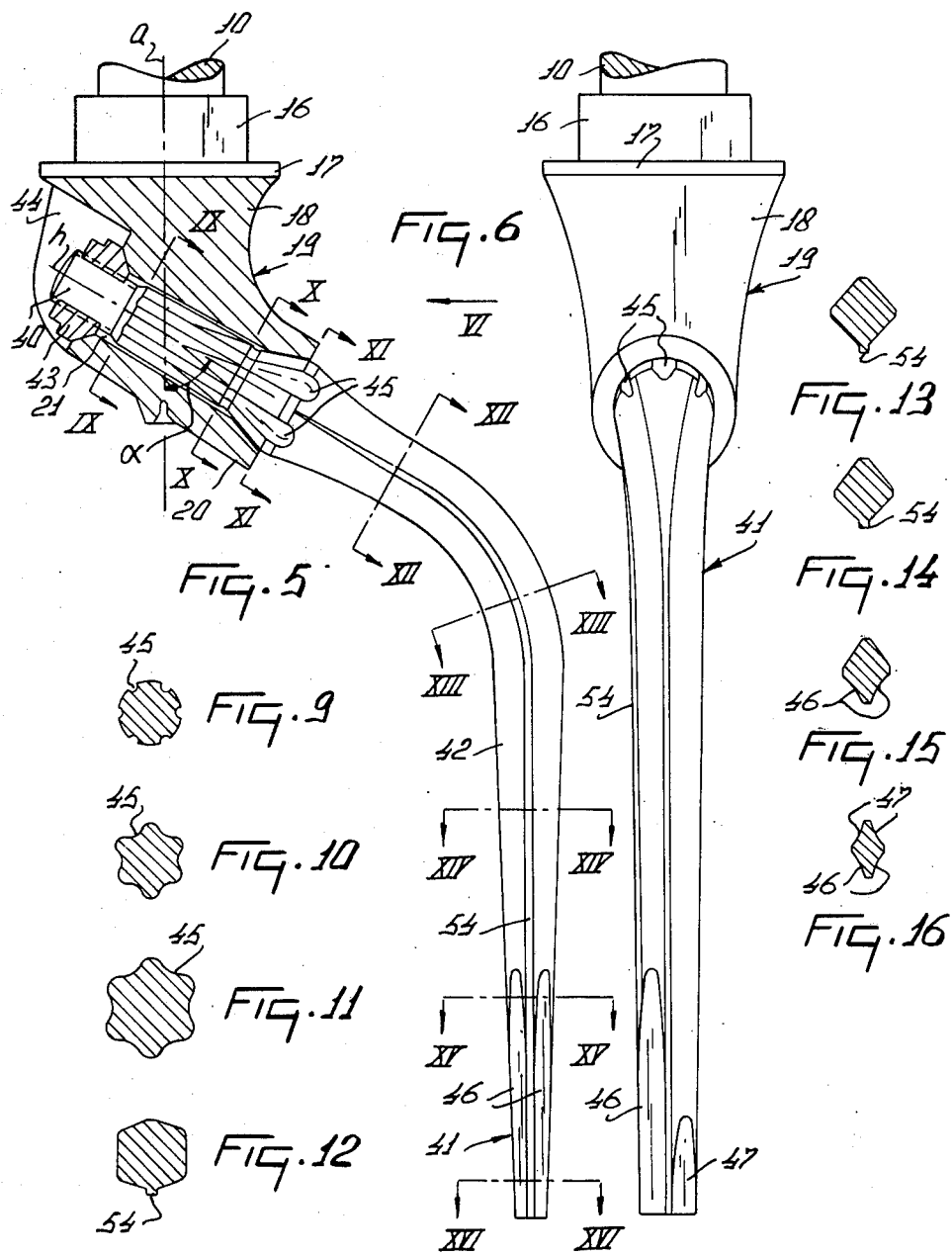

ROTARY HARROWS

Figure 3:
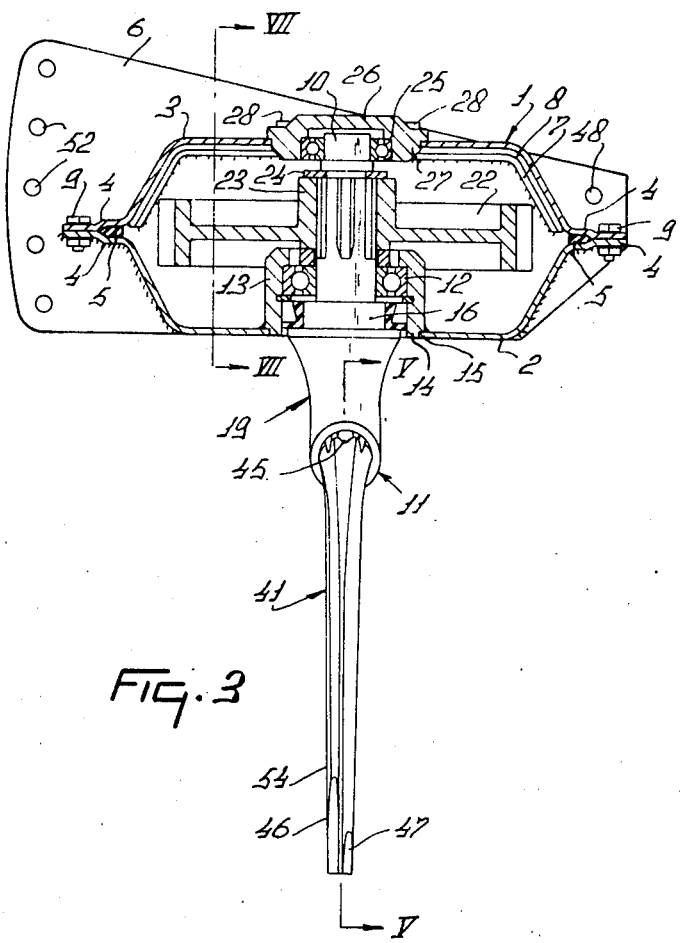
Figure 7:
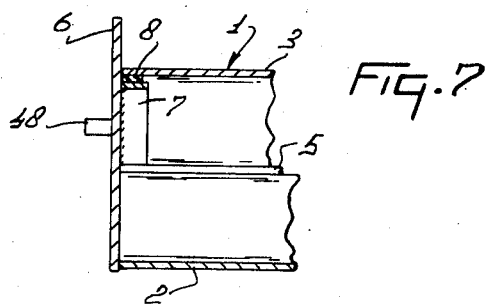
Figure 4:
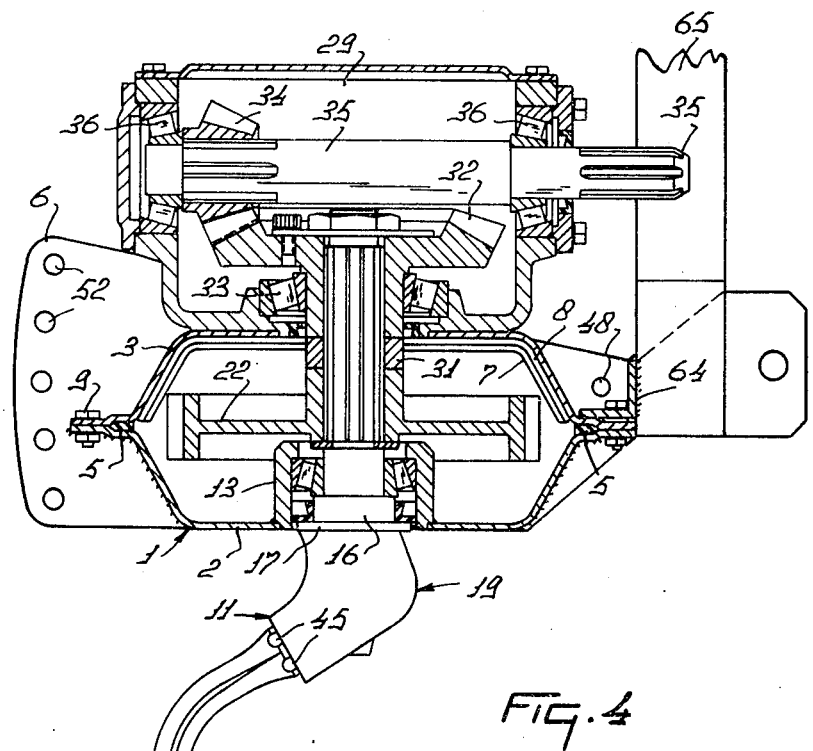
Figure 8:
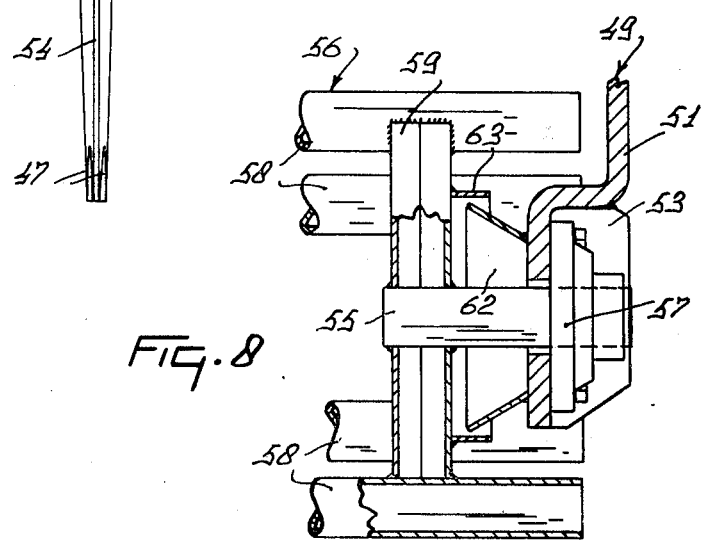

For a better understanding of the invention, and to show how the same may be carried into effect, reference will now be made, by way of example, to the accompanying drawings, in which:

FIG. 1 is a plan view of a rotary harrow in accordance with the invention mounted at the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a section, to an enlarged scale, taken on the line IV—IV in FIG. 1, FIG. 5 is a section, to an enlarged scale, taken on the line V—V in FIG. 3, FIG. 6 is an elevation as seen in the direction indicated by an arrow VI in FIG. 5, FIG. 7 is a section taken on the line VII—VII in FIG. 3, FIG. 8 is a part-sectional elevation, to an enlarged scale, illustrating details of the rotary mounting of a supporting member or roller at the rear of the harrow, and FIGS. 9 to 16 are sections taken on the lines IX—IX to XVI—XVI respectively in FIG. 5 of the drawings.

Referring to the accompanying drawings, and particularly to FIGS. 1 to 4 thereof, the rotary harrow that is illustrated, and which could also be considered as being a soil cultivating implement or cultivator, has a hollow box-shaped frame portion 1 that extends substantially horizontally transverse, and normally substantially horizontally perpendicular, to the intended direction of operative travel of the harrow which is indicated by an arrow A in FIG. 1 of the drawings. The frame portion 1 comprises identical lower and upper portions 2 and 3 that are both of substantially U-shaped cross-section, the upper portion 3 being inverted with respect to the lower portion 2. The webs or bases of the lower and upper portions 2 and 3 are both substantially horizontally disposed and are in substantially parallel relationship with one another. The limbs of the substantially U-shaped, in cross-section, portions 2 and 3 both diverge away from their webs or bases with the result that the assembled frame portion 1 is of substantially hexagonal, although not regular hexagonal, cross-section. The free edges of the limbs of both the lower portion 2 and the upper portion 3 are bent over the form rims 4 that bear against each other throughout parts of their widths when the frame portion 1 is assembled, said rims 4 being substantially parallel to the webs or bases of the two lower and upper portions 2 and 3. It can be seen from FIGS. 3 and 4 of the drawings that the rims 4 include regions that are offset respectively downwardly and upwardly relative to regions thereof that are in abutting contact, said offset regions being located inwardly of the abutting regions with respect to the center of the whole frame portion 1. The offset and therefore relatively spaced regions of the rims 4 have a gasket 5 or other sealing material between them. The opposite ends of the lower portion 2 of the hollow frame portion 1 comprise substantially vertical sector plates 6 that both extend substantially parallel to the direction A. The sector plates 6 project beyond the frame portion 1 at the top of the latter and at both the front and the rear thereof with respect to the direction A (see FIG. 2). The side of each sector plate 6 that faces inwardly of the hollow frame portion 1 is provided with a rib 7 for co-operation with the corresponding end of the upper frame portion 3, a gasket 8 or other sealing material being interposed between each rib 7 and the upper frame portion 3. Vertically aligned holes are formed in the abutting regions of the rims 4 and short bolts 9 are entered through those holes to secure the upper portion 3 firmly, but readily releasably, to the lower frame portion 2.

The frame portion 1 rotatably carries a plurality of shafts 10, of which there are twelve in the example which is being described, said shafts 10 affording the axes of rotation $a$ of corresponding soil working members that are generally indicated by the reference 11 in the accompanying drawings. Each axis $a$ is vertically or substantially vertically disposed and immediately neighbouring axes $a$ are spaced apart from one another in a single row by regular distances which, it is preferred, should have magnitudes of substantially 25 centimeters. The lower ends of the shafts 10 project from beneath the bottom of the lower frame portion 2 and are rotatably supported from that frame portion by corresponding ball bearings 12. Each bearing 12 is accommodated in a corresponding bearing housing 13 which is rigidly secured to the lower frame portion 2, said bearing housings 13 being disposed substantially wholly internally of the frame portion 1. In fact, each bearing housing 13 has a corresponding lower rim 14 that seats in a hole 15 in the web or base of the lower frame portion 2 in such a way that, when assembled, the lower surface of each rim 14 is substantially flush with the lower outer surface of the web or base of the lower frame portion 2. Each shaft 10 is formed with a shoulder 16 at a location beneath the corresponding bearing 12 and with a ring or land 17 that follows the shoulder 16 beneath the latter. The ring or land 17 adjoins a narrow region 18 of a corresponding tine mounting which is generally indicated by the reference 19. Each mounting 19 also comprises a corresponding sleeve-like tine holder 20 (FIG. 5). The narrow regions 18 of the mountings 19 are of substantially oval cross-section and the holders 20 have corresponding central openings or bores 21 which receive the fastening portions 40 of corresponding soil working tines 41 that will be further described below.

The longitudinal axis $h$ (FIG. 5) of each central bore 21 either intersects, as illustrated, the axis of rotation $a$ of the corresponding shaft 10 or is disposed in the immediate proximity of that axis $a$. An angle $\alpha$ is enclosed between the axes $a$ and $h$ as seen in FIG. 5 of the drawings, said angle $\alpha$ opening downwardly towards the ground surface and having a magnitude of substantially 60° in the embodiment which is illustrated. A sealing ring 18A surrounds each shoulder 16, immediately above the corresponding ring or land 17, at a location just inside the corresponding housing 13. The housings 13 are releasably secured inside the hollow frame portion 1 by bolts and the top of each of them is formed with a hole through which the corresponding shaft 10 passes. That part of each shaft 10 that is located above the corresponding housing 13 inside the hollow frame portion 1 is splined for co-operation with internal splines in the hub of a corresponding straight- or spur-toothed pinion 22. As can be seen in outline in FIG. 1 of the drawings the sizes of the 12 pinions 22 are such that the teeth of each pinion are in mesh with those of its immediate neighbour, or both of its immediate neighbours, in the single row thereof. It will be noted from FIG. 3 of the drawings that the pinions 22 are located at substantially the same horizontal level as that of the junction between the lower and upper frame portions 2 and 3. In the illustrated embodiment, a plane containing the abutment surfaces of the rims 4 also contains a point on each tooth of each pinion 22 that is midway between the uppermost and lowermost end of that tooth, said plane extending substantially horizontally perpendicular to all of the axes of rotation $a$. The top of each pinion 22 has a central upwardly projecting hub 23 whose upper end bears against the lower surface of a corresponding circlip 24 that is engaged in a groove in the corresponding shaft 10. The uppermost end of each shaft 10 is of reduced diameter as compared with the splined region thereof and co-operates with the inner race of a corresponding ball bearing 25. The outer race of each ball bearing 25 is accommodated in a corresponding housing 26 which has a rim 27 that seats in a hole formed in the web or base of the upper frame portion 3, four bolts 28 being employed to secure the rim 27 of each housing 26 firmly but releasably to the upper portion 3 of the frame portion 1. It will be noted that the holes in the lower and upper frame portions 2 and 3 that receive the corresponding bearing housings 13 and 26 are of the same size and are similarly located. This considerably simplifies manufacture of the hollow frame portion 1 since the lower and upper portions 2 and 3 thereof may be completely identical and be formed from sheet metal which preferably has a thickness of substantially 15 millimeters.

The shafts 10 that correspond to both the two center soil working members 11 of the single row of 12 such members are both formed with upward extensions which project into corresponding gear boxes 29 and 30. Each of the two gear boxes 29 and 30 has a housing whose bottom is formed around the corresponding shaft extension with a concentric rim that will fit in one of the holes in the web or base of the upper frame portion 3 for cooperation therewith in the manner of the rims 27 that have been described above. The construction and arrangement of the gear box 29 is illustrated in detail in FIG. 4 of the drawings and it should be noted that the gear box 30 is substantially identical in construction and arrangement except that it is somewhat smaller in size. The extension of the shaft 10 that co-operates with the gear box 29 is splined throughout substantially all of its length, the splines being extensions of those that cooperate with the hub 23 of the corresponding pinion 22. The splines on the extension of the shaft 10 carry, inside the gear box 29 the hub of a crown wheel 32, that crown wheel being axially spaced from the hub of the corresponding pinion 22 by a ring 31. A roller bearing 33 rotatably supports the hub of the crown wheel 32 in the housing of the gear box 29 at the bottom of the latter. It will be noted that, in FIG. 4 of the drawings, the ball bearing 12 is replaced by a roller bearing. The teeth of the crown wheel 32 are in driven mesh with those of a bevel pinion 34 mounted on a splined portion of a shaft 35 that extends substantially horizontally parallel to the direction A and whose leading, with respect to that direction, splined end projects forwardly from the front of the gear box 29. The shaft 35 is rotatably mounted in the gear box 29 by roller bearings 36 that are lodged in the front and rear walls of the housing of that gear box.

The top of each of the two gear boxes 29 and 30 is afforded by a corresponding plate that is removably secured to the remainder of the housing of the corresponding gear box by bolts. Bolts are also employed to fasten the gear boxes 29 and 30 releasably to the top of the upper frame portion 3. The crown wheel 32 in the gear box 29 is of larger size than a corresponding crown wheel 37 (FIG. 1) inside the gear box 30, the latter crown wheel 37 being mounted on the upward extension of the corresponding shaft 10. The teeth of the crown wheel 37 are in driven mesh with those of a bevel pinion 38 mounted on a substantially horizontal shaft 39 that is similar in construction and arrangement to the shaft 35 in the gear box 29. The forwardly projecting splined end of either the shaft 35 or the shaft 39 can be placed in driven connection with the power take-off shaft of an agricultural tractor or other operating vehicle through the intermediary of a telescopic transmission shaft 67, that is of a construction which is known per se, having universal joints at its opposite ends. Since the transmission ratio between the pinion 34 and the crown wheel 32 in the gear box 29 is different to that between the pinion 38 and the crown wheel 37 in the gear box 30, all of the shafts 10, and thus all of the soil working members 11, will be rotated at a different speed, in response to the same speed of rotation of the power take-off shaft of the operating tractor or other vehicle, if the shaft 35 is chosen for co-operation with the telescopic transmission shaft 67 in preference to the shaft 39, or vice versa.

The central bore 21 of each tine holder 20 is constructed and arranged to receive the fastening portion 40 of one of the tines 41, said fastening portion 40 terminating in, and being integral with, an active or soil working portion 42 of the same tine 41. The fastening portion 40 of each tine 41 comprises a first tapering part that commences at the integral junction between the corresponding portions 40 and 42 and that extends from that junction towards the free end of the fastening portion 40. The first tapering part that has just been mentioned co-operates with a matchingly shaped region of the central bore 21. The first tapering part of the fastening portion 40 adjoins a second tapering part that is of greater axial length, but less steep tapering configuration, than the first tapering part. In fact, the second tapering part has an axial length which is substantially three times that of the first tapering part and it terminates, at the end thereof remote from its junction with the first tapering part, in a screwthreaded part which, when the tine 41 is in its operative position, projects beyond the end of the corresponding bore 21. The screwthreaded part is arranged to receive a fastening nut 43 which has a frustoconical clamping surface arranged to co-operate centringly with the matchingly shaped surface of a mouth of the bore 21. It will be noted from FIG. 5 of the drawings that, in fact, the mouth of each bore 21, the corresponding fastening nut 43 and the corresponding co-operating screwthreaded part are all located internally of a screening recess 44 that is formed in the material of the corresponding narrow region 18 of the tine mounting 19 concerned.

It can be seen from FIGS. 5 and 11, in particular, of the drawings that, in the region of the integral junction between the fastening portion 40 and the active or soil working portion 42 of each tine 41, said tine has a polygonal cross-section which, it is preferred, should be of regular hexagonal configuration. However, the corners of the regular hexagon are rounded off as seen in cross-section and the what would otherwise be flat sides thereof are formed with hollow recesses or grooves 45 which extend longitudinally along the tine into the fastening portion 40 thereof in which they become narrower and eventually terminate where the second tapering part of said portion 40 merges into the screwthreaded part thereof. The widths and depths of the hollow recesses or grooves 45 can be seen at various locations along the length of each tine 41 in FIGS. 5, 9, 10 and 11 of the drawings and it will be noted that said recesses or grooves 45 extend for short distances into the active or soil working portion 42 of each tine 41 and, at those locations, have their broadest widths but are terminated in rounded ends.

Commencing from its integral junction with the corresponding fastening portion 40, the active or soil working portion 42 of each tine 41 is initially in rectilinear alignment with that portion 40 but is subsequently curved downwardly to form a further substantially straight region whose longitudinal axis is substantially parallel to the corresponding axis of rotation $a$. Each active or soil working tine portion 42 also tapers progressively from the junction thereof with the corresponding fastening portion 40 towards the free end or tip of said portion 42. As can be seen best in FIGS. 5, 6, 11, 12 and 13 of the drawings, the regular hexagonal cross-section at the integral junction between the portions 40 and 42 gradually changes until, at substantially the level of the cross-section of FIG. 13 of the drawings, it has become a substantially rectangular cross-section, this change thus being completed near the lowermost end of the bend which integrally interconnects the two substantially straight regions of the tine portion 42. As will be evident from FIGS. 13 to 16 of the drawings, the substantially rectangular cross-section is progressively flattened towards the lowermost free end or tip of the tine portion 42 until, at and near that free end or tip (see FIG. 16), the ratio between the lengths of diagonals that interconnect the opposite corners of the cross-section of the tine portion 42 is substantially 1:2. The longer of these two diagonals, as seen in the cross-section of FIG. 16 of the drawings, extends substantially tangentially with respect to a circle centered upon the corresponding axis of rotation $a$. The leading edge, with respect to the intended direction of rotation B (FIG. 1) of the corresponding soil working member 11, of the active or soil working portion 42 of each tine 41 is flattened to produce a rib 54 that extends downwardly from substantially the level of FIG. 12 of the drawings to substantially the level of FIG. 15 thereof. In fact, all four of the corners, as seen in cross-section, of the region of the tine portion 42 that is of substantially rectangular cross-section are flattened but only at the leading edge of the portion 42 with respect to the corresponding direction B is the flattening so pronounced as to produce the rib 54. It will also be noted from FIGS. 5, 6, 15 and 16 of the drawings that, commencing from the free end or tip of each active or soil working tine portion 42, hollow recesses or grooves extend upwardly along that portion for different distances. There are, in fact, two leading hollow recesses or grooves 46 in the what would otherwise be flat surfaces of the tine portion 42 that face obliquely forwardly with respect to the corresponding direction B and two similar trailing hollow recesses or grooves 47 in the corresponding surfaces that face obliquely rearwardly with respect to the corresponding direction B. The leading recesses or grooves 46 have lengths which are equal to substantially one-fifth of the total length of the active or soil working tine portion 42 and are substantially twice as long as the trailing recesses or grooves 47 which extend throughout only substantially one-tenth of the overall length of the portion 42. The substantially straight region of each active or soil working tine portion 42 that extends between the integral junction with the corresponding fastening portion 40 and the downward curve of said portion 42, has rounded corners, as seen in cross-section (FIG. 12), except as regards the leading corner with respect to the direction B which corner affords the rib 54. These rounded corners (in cross-section) or edges extend at least as far as substantially the upper end of the curve in the length of the tine portion 42.

Each of the sector plates 6 is provided, at the front thereof with respect to the direction A, with a substantially horizontally disposed stub shaft 48, the two stub shafts 48 being in axial alignment in a direction parallel to the row of soil working members 11. An arm 49 is turnable upwardly and downwardly about the corresponding stub shaft 48 alongside each sector plate 6 and extends generally rearwardly from the corresponding stub shaft 48 with respect to the direction A. Each arm 49 includes a leading substantially straight portion 50 which terminates alongside the rearmost edge of the corresponding sector plate 6, and also a rear downwardly inclined portion 51 which, as can be seen in FIG. 2 of the drawings, becomes broader towards the end thereof that is remote from its integral junction with the corresponding substantially straight portion 50. The rearmost edge of each sector plate 6 with respect to the direction A is formed with a curved row of holes each hole of which is equidistant from the axis that is defined by the substantially horizontally aligned stub shafts 48. Each arm 49 is formed with a single hole that can be brought into register with any chosen one of the row of holes in the corresponding sector plate 6 by turning the arm 49 concerned upwardly or downwardly, as may be required, about the corresponding stub shaft 48. A horizontal locking pin 52, or equivalent bolt, is provided for entry through the single hole in each arm 49, and through the chosen hole in the corresponding sector plate 6, to maintain the arm 49 concerned in a corresponding angular setting about the axis defined by the stub shafts 48. It will be noted from FIGS. 1 and 8 of the drawings that the downwardly inclined portions 51 of the arms 49 are offset towards one another, by way of angular bends, at locations that are short distances in front, with respect to the direction A, of their rearmost free ends. The offset regions of the arms 49 carry bearing housings 57 in which substantially horizontally aligned bearings are located between screening plates 53, said screening plates 53 also serving as guides to assist in the mounting of the housings 57. The substantially horizontally aligned bearings rotatably receive stub shafts 55 at the opposite axial ends of a rotatable supporting member 56 of the harrow that is in the form of a ground roller. The rotatable supporting member 56 comprises a plurality of elongate tubular elements 58 that extend substantially parallel to the axis of rotation of said member 56 at the periphery thereof, said elements 58 being welded to hollow substantially disc-shaped supports 59 that are fastened to the two stub shafts 55 and to further disc-shaped supports 60 that are similar to the supports 59 except that they only interconnect the elements 58 and are not directly connected to the stub shafts 55. There are a plurality of the elements 58 which are regularly spaced apart from one another around the axis of rotation of the supporting member 56 and the supports 59 and 60 are regularly spaced apart from one another along the axial length of said member 56. There are six of the elements 58 in the example which is being described and it will be seen from FIG. 2 of the drawings that, between each pair of neighbouring elements 58, the supports 59 and 60 are formed with inwardly curved recesses 61.

The inwardly offset region of each arm 49 is provided at its inner side with a frusto-conical shield 62 that is divergent in a direction away from the arm 49, the central axis of each shield 62 being coincident with the longitudinal axis of the corresponding stub shaft 55 which it surrounds. The larger free circular edge of each shield 62 is disposed close to the corresponding hollow disc-shaped support 59 and is closely surrounded by a ring 63 one edge of which is welded to the corresponding support 59. This arrangement provides effective protection for the rotary bearings of the supporting member 56 from stones and other potentially damaging foreign bodies. The front of the frame portion 1 with respect to the direction A carries a coupling member or trestle 65 of generally triangular configuration, the bottom of said coupling member or trestle 65 being secured to the leading rims 4 of the lower and upper frame portions 2 and 3 by bars 64 of L-shaped cross-section having upright limbs that are welded to the coupling member or trestle 65 and horizontal limbs that are fastened to the rims 4 by appropriately positioned bolts 9. An upper region of the coupling member or trestle 65 is rigidly connected to the rims 4 at the rear of the frame portion 1 by tie bars 66 that extend from said coupling member or trestle in downwardly and rearwardly inclined divergent relationship (see FIGS. 1 and 2). The coupling member or trestle 65 exhibits coupling means that are constructed and arranged for connecting the frame portion 1 of the harrow to the three-point lifting device or hitch at the rear of an agricultural tractor or other operating vehicle in the manner illustrated in FIGS. 1 and 2 of the drawings.

In the use of the rotary harrow that has been described, its coupling member or trestle 65 is connected to the three-point lifting device or hitch at the rear of an agricultural tractor or other operating vehicle and either the shaft 35 or the shaft 39 is placed in driven connection with the power take-off shaft of the same agricultural tractor or other operating vehicle by way of the telescopic transmission shaft 67. Upon moving in the direction A over soil that is to be cultivated with drive applied to the chosen shaft 35 or 39, all of the soil working members 11 will rotate in the directions B that are illustrated in FIG. 1 of the drawings, each direction of rotation B being opposite to the direction of rotation B of the or each neighbouring soil working member 11 in the single row thereof. The tines 41 are angularly offset from each other around the axes of rotation $a$ in such a way that no tine 41 will ever foul the tine 41 of the neighbouring, or each neighbouring, soil working member 11. The lower substantially straight regions of the active or soil working portion 42 of the tines 41 describe circular paths, as seen in FIG. 1 of the drawings, that overlap each other so that a single broad strip of worked soil is produced. The described and illustrated construction of the frame portion 1 enables that frame portion to be made from sheet metal in an inexpensive way and the lower bearing housings 13 effectively prevent stones and other obstacles that may be met with from damaging the bearings 12 and other associated parts. It will be noted from the drawings that the limbs of the lower frame portion 2 are significantly inclined to both the vertical and the horizontal so that stones can slide along those limbs while always tending to be urged downwardly towards the ground. The tine mountings 19 are of an inexpensive construction inasmuch as they are formed integrally with the corresponding shafts 10. The shape of each tine mounting 19, its generally downwardly directed orientation with respect to the corresponding axis $a$ and the downward orientation of each tine holder 20 and the tine parts that co-operate therewith all tend to ensure that, during operation of the harrow, any displaced stones that may momentarily come into engagement with one or more tine mountings 19 and upper parts of at least one tine 41 will be urged downwardly towards the ground surface where they will not cause damage. This feature is further enhanced by forming the upper substantially straight region of the active or soil working portion 42 of each tine 41 in rectilinear alignment with the corresponding tine fastening portion 40 and by the fact that each soil working member 11 comprises only a single tine 41 thus leaving larger spaces for stones to move downwardly towards the ground surface than in rotary harrows and other soil cultivating implements and cultivators that have two or more soil working tines per soil working member. The regular hexagonal cross-section of most of each tine fastening portion 40 and of an upper part of each active or soil working tine portion 42 imparts sufficient rigidity to those regions of the tines without the strength being adversely affected by the hollow recesses or grooves 45. Each tine 41 has its maximum cross-sectional area at substantially the level of the integral junction between its two portions 40 and 42 (FIG. 11). The rounded off corners (in cross-section) or edges of the tine assist in preventing jamming of stones and in pushing away any stones that might become momentarily jammed. Despite the fact that each soil working member 11 comprises only a single tine 41, the harrow does not operate jerkily because the tines 41 are angularly offset from one another around the corresponding axes of rotation $a$ so that, generally speaking, at any given instant during operation, as many tines 41 will be located at the left-hand sides of the corresponding axes $a$ as there are tines 41 at the right-hand sides of the corresponding axes $a$ when the machine is viewed in the direction A. Owing to the particular arrangement of the pinions 22 that has been described, and that is visible in FIGS. 1 and 3 of the drawings, each pinion 22 can readily be removed from the corresponding shaft 10 in an upward direction after taking off the upper frame portion 3, the gear boxes 29 and 30 and the circlips 24. If mere access to the pinions 22 is required, it is not, of course, necessary to remove the circlips 24. The simple gear boxes 29 and 30 enable the soil working members 11 to be driven at a higher speed by employing the shaft 35 than by employing the shaft 39 without changing the rotational speed of the rotary driving force which is applied with the result that the soil working members 11 of the harrow can operate at a speed appropriate to the nature and condition of the soil that requires cultivation.

The rotatable supporting member 56 at the rear of the harrow, which member is in the form of an open ground roller, controls the depth of penetration of the tines 41 into the ground by virtue of the level of its axis of rotation relative to the level of the remainder of the harrow. This level is, of course, adjustable upwardly or downwardly by temporarily removing the locking pins 52, or equivalent bolts, turning the arms 49 to new angular settings about the axis defined by the stub shafts 48 and then replacing the locking pins 52 or equivalent bolts. The rotatable supporting member 56 combines high rigidity with light weight principally as the result of employing the hollow disc-shaped supports 59 and 60. This feature is of particular importance in rotary harrows which have a large working width such as, for example, 4, 5 or 6 meters. The broadening of the downwardly inclined portions 51 of the arms 49 is also of importance since it is those portions which carry the rotary bearings for the supporting member 56. When the rotary harrow is of large working width, with a consequent increase in the axial length and weight of the rotatable supporting member 56, the portions 51 of the arms 49 are capable of withstanding the increased loading to which they are then subject. The housing and screening of the rotary bearings for the stub shafts 55 at the opposite ends of the supporting member 56 ensure that the likelihood of damage to the bearings by stones and other foreign bodies is very low.

Although various features of the rotary harrow that has been described, and that is illustrated in the accompanying drawings, will be set forth in the following claims as inventive features, it is emphasised that the invention is not necessarily limited to those features and that it includes within its scope each of the parts of the rotary harrow that has been described and/or that has been illustrated in the accompanying drawings both individually and in various combinations.

What I claim is:

1. A rotary harrow comprising a frame having an elongated frame portion that extends transverse to the direction of travel, a plurality of soil working members being mounted on corresponding upwardly extending shafts and said shafts being journalled in said frame portion, said frame portion being hollow and having opposing upper and lower shaped portions that are substantially identical in cross-section configuration, said upper and lower portions having outer rims that adjoin one another substantially midway between a top and bottom of said frame portion that are defined by the bases of said upper and lower portions respectively, said shafts being connected to driving means housed within said frame portion, said driving means including corresponding pinions on said shafts and said pinions having teeth in mesh with one another, the teeth of said pinions being located at substantially the same level as said rims of the upper and lower portions of said frame portions.

2. A harrow as claimed in claim 1, wherein said upper and lower frame portions are substantially U-shaped in cross-section and have divergent limbs that flank the respective bases of said upper and lower frame portions respectively.

3. A harrow as claimed in claim 2, wherein the outer edges of said limbs are bent over and form said rims, the rims of said upper and lower portions being connected to adjoin one another by detachable means.

4. A harrow as claimed in claim 1, wherein a plane perpendicular to the axis of rotation of each pinion and located midway between a top and bottom of said pinion, passes through the interengaging surfaces of said rims.

5. A harrow as claimed in claim 4, wherein said driving means comprises two different transmissions positioned on top of said upper frame portion, said transmissions being connected to transmit drive to said pinions and their soil working members, at different speeds, each of said transmissions being alternately connectable to a p.t.o. imput shaft, said transmissions being accommodated in corresponding gear housings.

6. A harrow as claimed in claim 1, wherein the upper and lower portions of said frame portion are each formed from a single piece of sheet metal.

7. A harrow as claimed in claim 1, wherein each pinion has an upper side, a lower side and a central hub, said hub projecting axially from said upper side.

* * * * *